(12) United States Patent
Tada et al.

(10) Patent No.: US 7,080,099 B2
(45) Date of Patent: Jul. 18, 2006

(54) METHOD AND SYSTEM FOR STORING AND MANAGING ELECTRONIC MAIL

(75) Inventors: Katsumi Tada, Kawasaki (JP); Toru Takahashi, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 445 days.

(21) Appl. No.: 10/167,011

(22) Filed: Jun. 10, 2002

(65) Prior Publication Data

US 2003/0041112 A1 Feb. 27, 2003

(30) Foreign Application Priority Data

Aug. 24, 2001 (JP) ............................. 2001-253933

(51) Int. Cl.
*G06F 7/00* (2006.01)
(52) U.S. Cl. .................... 707/104.1; 707/100; 707/101
(58) Field of Classification Search .......... 707/1–104.1
See application file for complete search history.

(56) References Cited

U.S. PATENT DOCUMENTS

| | | | | |
|---|---|---|---|---|
| 5,832,208 A * | 11/1998 | Chen et al. | ................ | 713/201 |
| 5,948,059 A * | 9/1999 | Woo et al. | .................. | 709/206 |
| 5,951,638 A * | 9/1999 | Hoss et al. | ................. | 709/206 |
| 6,256,666 B1 * | 7/2001 | Singhal | ...................... | 709/217 |
| 6,278,996 B1 * | 8/2001 | Richardson et al. | ........... | 707/6 |
| 6,360,252 B1 * | 3/2002 | Rudy et al. | ................ | 709/206 |
| 6,405,225 B1 * | 6/2002 | Apfel et al. | ................ | 715/526 |
| 6,405,244 B1 * | 6/2002 | Bando et al. | ............... | 709/206 |
| 6,757,712 B1 * | 6/2004 | Bastian et al. | ............. | 709/206 |
| 2001/0002204 A1 * | 5/2001 | Jebens et al. | .......... | 375/240.01 |
| 2002/0016718 A1 * | 2/2002 | Rothschild et al. | ........... | 705/2 |
| 2002/0042916 A1 * | 4/2002 | Mineyama | ................... | 725/39 |
| 2002/0065892 A1 * | 5/2002 | Malik | .......................... | 709/206 |
| 2002/0087620 A1 * | 7/2002 | Rouse et al. | ................ | 709/203 |
| 2002/0116263 A1 * | 8/2002 | Gouge | .......................... | 705/14 |
| 2002/0138582 A1 * | 9/2002 | Chandra et al. | ........... | 709/206 |

FOREIGN PATENT DOCUMENTS

| | | |
|---|---|---|
| JP | 2001-084193 | 3/2001 |
| JP | 2001-142801 | 5/2001 |

* cited by examiner

*Primary Examiner*—Luke S Wassum
*Assistant Examiner*—Linh Black
(74) *Attorney, Agent, or Firm*—Townsend and Townsend and Crew LLP

(57) ABSTRACT

A computerized document management system manages and allows viewing of attachment documents in groups of electronic mail messages. A determination is first made as to whether an electronic mail message is a task message. If so, task history information, including the main text of the electronic mail message, attribute information, and information about relations with other messages, is stored. The attachment documents are then extracted and stored together with attachment document management information. Upon receipt of a search request, a list of attachment documents and task histories can then be displayed.

12 Claims, 22 Drawing Sheets

| Section head A's incoming mail | | |
|---|---|---|
| Subject | Sender | Date |
| ⋮ | ⋮ | ⋮ |
| Re: Document | *C* | *01/3/30* |
| × × | D | 01/3/29 |
| ⋮ | ⋮ | ⋮ |
| Re: Document | *B* | *01/3/29* |
| ⋮ | ⋮ | ⋮ |

\* Selecting relevant mail is complicated
\* Looking up attachment documents is difficult

FIG.8

```
From: A@hitachi.co.jp
To: B@hitachi.co.jp, C@hitachi.co.jp
Message-ID: <AAAAAAAAAAAAAAAAAAAAAAAAAAAA1@hitachi.co.jp>
Date: Fri,01 Jun 2001 11:18:41 +0900
Subject: [Competitor Survey] Survey of Z Corp.

A

To Supervisor B, Supervisor C

Regarding Z Corp. activities, I would like to ask Supervisor B
to research management strategies and Supervisor C to research
products.
```

FIG.9

From: B@hitachi.co.jp
To: A@hitachi.co.jp
Cc: C@hitachi.co.jp
Message-ID: <AAAAAAAAAAAAAAAAAAAAAAAAAAAA2@hitachi.co.jp>
In-Reply-To: <AAAAAAAAAAAAAAAAAAAAAAAAAAAA1@hitachi.co.jp>
Date: Mon, 04 Jun 2001 10:15:26 +0900
Subject: Re: [Competitor Survey: 3] Survey of Z Corp.
Attached document: Z Corp. Management. txt

B

To Section Head A
Cc Supervisor C

Attached is the research document regarding Z Corp. management strategies.

FIG.10

Total attachment document count: 2
Attachment document list:

| No | Attachment document name | Size | Creation date | Created by | Storage location |
|---|---|---|---|---|---|
| 1 | Z Corp. Management.txt | 1kB | 2001/6/4 10:15:26 | B | 3-1 |
| 2 | Z Corp. Products.txt | 2kB | 2001/6/4 11:23:36 | C | 3-2 |

FIG.14

| Search screen | |
|---|---|
| | Search  Reset |
| [Specify task history conditions] | |
| Task history initiator | |
| Task history starting date: | ☐ YY ☐ MM ☐ DD ~ ☐ YY ☐ MM ☐ DD |
| ⋮ | ⋮ |
| [Specify e-mail conditions] | |
| E-mail sender: | |
| E-mail transmission date: | ☐ YY ☐ MM ☐ DD ~ ☐ YY ☐ MM ☐ DD |
| E-mail addressee: | |
| ⋮ | ⋮ |

FIG.15

| List of task history search results | | | | |
|---|---|---|---|---|
| There was 1 matching task history. | | | | |
| No | Task history name | Initiator | Initiation date | Command |
| 3 | Z Corp. Survey | A | 2001/6/4 11:23:36 | [View attachments] |

FIG.16

| | List of attachment documents associated with task history 3 | | | ☐ |
|---|---|---|---|---|
| Task history 3 contains 2 attachment documents. | | | | |

| No | Attachment document name | Size | Creation date | Created by |
|---|---|---|---|---|
| 1 | Z Corp. Management.txt | 1kB | 2001/6/4 10:15:26 | B |
| 2 | Z Corp. Products.txt | 2kB | 2001/6/4 11:23:36 | C |

FIG.17

| List of e-mail messages associated with task history 3 | | | ☐ |
|---|---|---|---|
| Task history 3 contains 3 e-mail messages | | | |

| No | Subject | Transmission date | Sender |
|---|---|---|---|
| 1 | Z Corp. Survey | 2001/6/1 11:18:41 | A |
| 2 | re: Z Corp. Survey | 2001/6/4 10:15:26 | B |
| 3 | re: Z Corp. Survey | 2001/6/4 11:23:36 | C |

FIG.18

| E-mail content display screen | □ |
|---|---|

From: A@hitachi.co.jp
To: B@hitachi.co.jp, C@hitachi.co.jp
Message-ID: <AAAAAAAAAAAAAAAAAAAAAAAAAAAA1@hitachi.co.jp>
Date: Fri,01 Jun 2001 11:18:41 +0900
Subject: [Competitor Survey] Survey of Z Corp.

A

To Supervisor B, Supervisor C

Regarding Z Corp. activities, I would like to ask Supervisor B
to research management strategies and Supervisor C to research
products.

FIG.19

| List of e-mail search results | | | □ |
|---|---|---|---|
| There was 1 matching e-mail message. | | | |

| No | Subject | Transmission date | Sender |
|---|---|---|---|
| 1 | Z Corp. Survey | 2001/6/1 11:18:41 | A |

FIG.20

| List of task history search results | | | | | □ |
|---|---|---|---|---|---|
| There ware 2 matching task histories. | | | | | |
| No | Task history name | Initiator | Initiation date | Total # of attachments | Command |
| 3 | Z Corp. Survey | A | 2001/6/4 11:23:36 | 3 | [View attachment] |
| 5 | Y Corp. Comparison | D | 2001/6/7 10:52:19 | 0 | [View attachment] |

FIG.21

| List of task history search results | | | | | □ |
|---|---|---|---|---|---|
| There ware 2 matching task histories. | | | | | |
| No | Task history name | Initiator | Initiation date | attachments | Command |
| 3 | Z Corp. Survey | A | 2001/6/4 11:23:36 | Yes | [View attachment] |
| 5 | Y Corp. Comparison | D | 2001/6/7 10:52:19 | No | [View attachment] |

FIG.22

| No | Task history name | Initiator | Initiation date | Command |
|---|---|---|---|---|
| 3 | Z Corp. Survey | A | 2001/6/4 11:23:36 | [View attachment] |
| 5 | Y Corp. Comparison | D | 2001/6/7 10:52:19 | [View attachment] |

List of task history search results

There was 1 matching task history.

FIG.23

| No | Task history name | Initiator | Initiation date | Command |
|---|---|---|---|---|
| 3 | Z Corp. Survey | A | 2001/6/4 11:23:36 | [View attachment] |
| 5 | Y Corp. Comparison | D | 2001/6/7 10:52:19 | |

List of task history search results

There was 1 matching task history.

FIG.24

| List of e-mail messages associated with task history 3 | | | □ |
|---|---|---|---|
| Task history 3 contains 3 e-mail messages. | | | View list of attachments in task history |

| No | Subject | Transmission date | Sender |
|---|---|---|---|
| 1 | Z Corp. Survey | 2001/6/1 11:18:41 | A |
| 2 | re: Z Corp. Survey | 2001/6/4 10:15:26 | B |
| 3 | re: Z Corp. Survey | 2001/6/4 11:23:36 | C |

FIG.25

E-mail content display screen □

From: A@hitachi.co.jp
To: B@hitachi.co.jp, C@hitachi.co.jp
Message-ID: <AAAAAAAAAAAAAAAAAAAAAAAAAAAA1@hitachi.co.jp>
Date: Fri,01 Jun 2001 11:18:41 +0900
Subject: [Competitor Survey] Survey of Z Corp.

View list of attachments in task history for this message   A

To Supervisor B, Supervisor C

Regarding Z Corp. activities, I would like to ask Supervisor B
to research management strategies and Supervisor C to research
products.

FIG.26

| List of e-mail search results | | | | |
|---|---|---|---|---|
| There was 1 matching e-mail message. | | | | |
| No | Subject | Creation date | Created by | Command |
| 1 | Z Corp. Survey | 2001/6/1 11:18:41 | A | [View list of attachments in task history] |

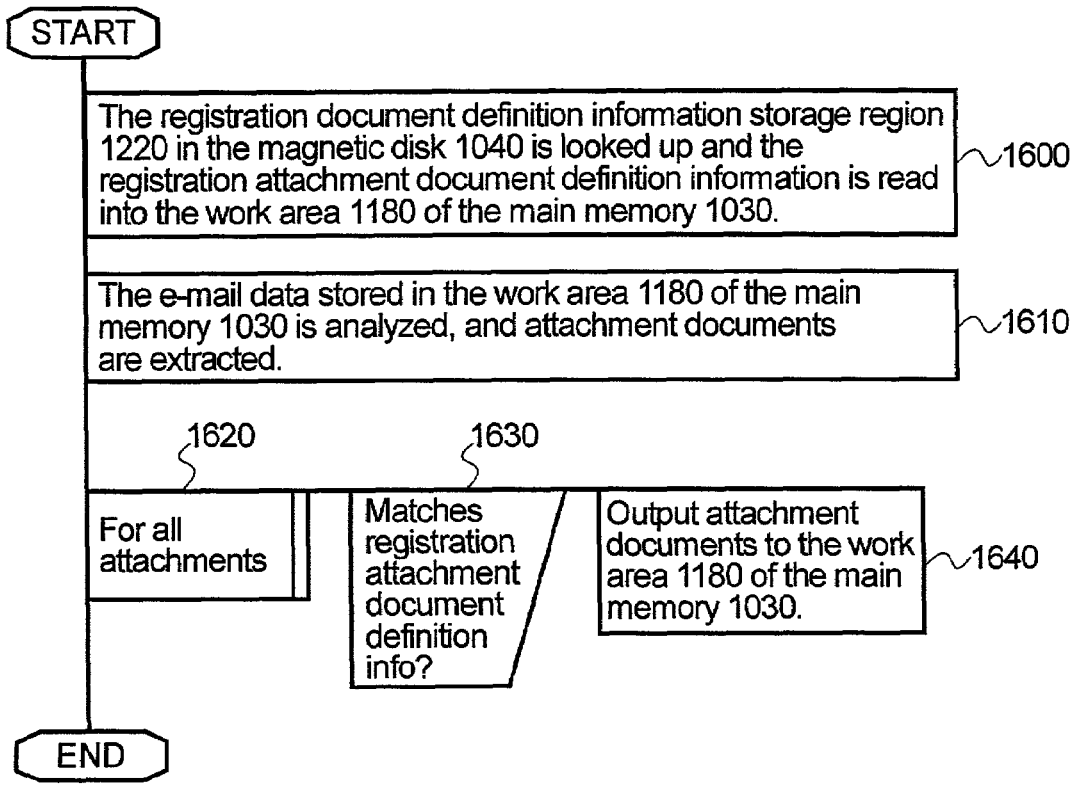

FIG.29

START

1600 — The registration document definition information storage region 1220 in the magnetic disk 1040 is looked up and the registration attachment document definition information is read into the work area 1180 of the main memory 1030.

1610 — The e-mail data stored in the work area 1180 of the main memory 1030 is analyzed, and attachment documents are extracted.

1620 — For all attachments

1630 — Matches registration attachment document definition info?

1640 — Output attachment documents to the work area 1180 of the main memory 1030.

END

FIG.30

| List of attachment documents associated with task history 3 | | □ |
|---|---|---|
| Task history 3 contains 2 attachment documents. ||| 
| No | Z Corp. Management. txt | Z Corp. Products. txt |
| 1 | B | — |
| 2 | — | C |

FIG.31

| List of attachment documents associated with task history 3 | | |
|---|---|---|
| Task history 3 contains 2 attachment documents. | | |

| No | Z Corp. Management. txt | Z Corp. Products. txt |
|---|---|---|
| 1 | Z Corp. Management. txt | — |
| 2 | — | Z Corp. Products. txt |
| 3 | Z Corp. Management1. txt | Z Corp. ProductsA. txt |

METHOD AND SYSTEM FOR STORING AND MANAGING ELECTRONIC MAIL

CROSS-REFERENCES TO RELATED APPLICATION(S)

This application claims the benefit of priority under 35 U.S.C. §119 from a Japanese patent application, serial no. 2001-253933, filed on Aug. 24, 2001.

BACKGROUND OF THE INVENTION

The present invention generally relates to electronic mail. More specifically, the present invention relates a method and system for facilitating retrieval of attachments attached to electronic mail messages.

In recent years, with the rapid expansion of the Internet and intranets, there has been a growing tendency to carry out tasks by preparing documents on personal computers in the form of electronic documents and distributing these documents to the relevant parties via electronic mail.

Since electronic mail can be used to send information almost immediately to a remote office and electronic mail transmission/receipt histories can be looked up relatively easily, electronic mail has become a crucial information transferring means in the creation and distribution of documents involving information exchange between multiple parties.

FIG. 3 shows a conventional process for creating and distributing documents using electronic mail. As shown in FIG. 3., a department or section head A first assigns responsibilities and sends a first electronic mail to both supervisor B and supervisor C. Next, supervisor B creates a document relating to his/her allotted task. This document is attached to an electronic mail that is then sent to section head A. Similarly, supervisor C also creates a document relating to his/her allotted task and attaches the document to an electronic mail that is then sent to section head A.

Section head A searches incoming electronic mail messages and retrieves the documents sent from supervisor A and supervisor B respectively. Section head A then reviews these documents and checks their contents.

In the method described above, the attached documents can be extracted only via their respective individual electronic mail messages, making retrieval and reuse of the documents inconvenient and difficult. In other words, an attached document cannot be easily located and retrieved without first identifying and opening its associated electronic mail.

The foregoing situation gets progressively worse as the number of electronic mail messages increases. As shown in FIG. 4, for example, a large number of electronic mail messages are received by section head A, including messages relating to other issues. If section head A desires to retrieve the documents sent by supervisors B and C, section head A must search for the electronic mail messages that are replies to the electronic mail messages previously sent to the supervisors B and C.

Typically, section head A may search for the relevant electronic mail messages by examining the sender identity and/or the subject field. This approach can also become tedious because there can be multiple electronic mail messages with the same sender and/or subject. As a result, section head A very often may need to check multiple electronic mail messages with attachments and look at their contents in order to be able to locate the desired document.

Furthermore, in a case where a document is created and distributed for comment and input to multiple supervisors, the supervisors may be sending revised versions of the original document. Thus, each of the attachment documents may need to be examined to check for consistency. This makes the process of looking up documents extremely complicated.

In order to be able to archive the attachment documents associated with electronic mail messages so that these documents can be reused at a later date, a predetermined folder is often used in a document management system to save and archive the relevant attachment documents.

A number of document management systems have been proposed that serve to efficiently save histories involving electronic mail. In one such system, the electronic mail messages sent and received by users are automatically captured by the document management system, which stores and manages the series of exchange of electronic mail messages based on the electronic mail transmission routes such as replies and forwardings. In this system, the electronic mail data that is to be sent and received by an electronic mail server is first received by a document server. The document server then determines whether the received electronic mail message is an electronic mail message that relates to a task (hereinafter referred to as task mail) for which data is to be stored in a database. If the electronic mail message is not a task mail, the message is sent to the target user without registering information relating to the electronic mail data into the database. If the electronic mail message is a task mail, the document server assigns an identification number (hereinafter referred to as a case number) that uniquely identifies the corresponding task history and registers it in the database. The corresponding case number is added to the subject field or the like of the electronic mail message in the form of string data. The processed electronic mail data is then sent to the destination user.

Subsequent electronic mail messages in which a case number referring to a task history is added to the subject field of the message are assumed to be additional information for the task history associated with that case number, and this information is registered in the database. More specifically, electronic mail identification information relating to the reply destination of the electronic mail message (e.g., Message-ID information in SMTP (Simple Mail Transfer Protocol)) is used to extract reference information in the message, e.g., the electronic mail message to which this electronic mail message is a reply. This information is recorded as transfer path information that is associated with the task history.

In the system described above, a series of electronic mail messages transferred as replies and forwards are managed as a single task history which can be searched and viewed. This reduces the amount of time and effort needed to find electronic mail messages that are replies to document creation instructions assigned to supervisors. However, when the contents of an attachment documents is to be checked, the attachment document still needs to be extracted via checking individual electronic mail messages. In other words, in order to find an attachment document that needs to be checked, the contents of each electronic mail message must be examined one by one. Also, if responsibilities are assigned to multiple supervisors in the creation of a document, it may be necessary to check for consistency in each of the sent documents.

Hence, it would be desirable to provide a document management method that allows attachment documents to

SUMMARY OF THE INVENTION

The present invention provides a method for storing and managing documents attached to electronic mail messages. An exemplary embodiment of the method includes: storing at least one electronic mail message sent and/or received via an electronic mail server as a series of electronic mail histories; extracting some or all of the attachment documents contained in the stored electronic mail message; and generating management information for an extracted attachment document for at least one electronic mail message contained in an electronic mail history.

According to one aspect of the present invention, in response to a search request that specifies an electronic mail history, a list of attachment documents associated with the specified electronic mail history is displayed.

According to another aspect of the present invention, series of electronic mail messages related to each other by forwarding, replying, and the like, are grouped, and lists of attachment document transferred in these groups are generated. This allows attachment documents to be viewed efficiently without having to look at each and every past electronic mail message.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 8 is a simplified diagram showing an example of a transferred electronic mail message;

FIG. 9 is a simplified diagram showing an example of a transferred electronic mail message;

FIG. 10 is a simplified diagram showing an example of attachment document management information according to a first exemplary embodiment of the present invention;

FIG. 14 is a simplified diagram showing a sample search screen according to a first exemplary embodiment of the present invention;

FIG. 15 is a simplified diagram showing a sample screen presenting a list of task history search results according to a first exemplary embodiment of the present invention;

FIG. 16 is a simplified diagram showing a sample screen presenting a list of task history attachment documents according to a first exemplary embodiment of the present invention;

FIG. 17 is a simplified diagram showing a sample screen presenting a list of task history electronic mail messages according to a first exemplary embodiment of the present invention;

FIG. 18 is a simplified diagram showing a sample screen presenting electronic mail content according to a first exemplary embodiment of the present invention;

FIG. 19 is a simplified diagram showing a sample screen presenting a list of electronic mail search results according to a first exemplary embodiment of the present invention;

FIG. 20 is a simplified diagram showing a first alternative example of a screen presenting a list of task history search results according to a first exemplary embodiment of the present invention;

FIG. 21 is a simplified diagram showing a second alternative example of a screen presenting a list of task history search results according to a first exemplary embodiment of the present invention;

FIG. 22 is a simplified diagram showing a third alternative example of a screen presenting a list of task history search results according to a first exemplary embodiment of the present invention;

FIG. 23 is a simplified diagram showing a fourth alternative example of a screen presenting a list of task history search results according to a first exemplary embodiment of the present invention;

FIG. 24 is a simplified diagram showing an alternative example of a screen presenting a list of task history electronic mail according to a first exemplary embodiment of the present invention;

FIG. 25 is a simplified diagram showing an alternative example of a screen presenting electronic mail content according to a first exemplary embodiment of the present invention;

FIG. 26 is a simplified diagram showing an alternative example of a screen presenting a list of electronic mail search results according to a first exemplary embodiment of the present invention;

FIG. 29 is a simplified diagram illustrating the flow of operations performed by the registration-evaluating attachment document extraction program according to a second exemplary embodiment of the present invention;

FIG. 30 is a simplified diagram showing a first alternative example of a screen presenting a list of task history attachment documents according to a first exemplary embodiment of the present invention; and FIG. 31 is a simplified diagram showing a second alternative example of a screen presenting a list of task history attachment documents according to a first exemplary embodiment of the present invention.

DETAILED DESCRIPTION OF THE INVENTION

Figure 1:
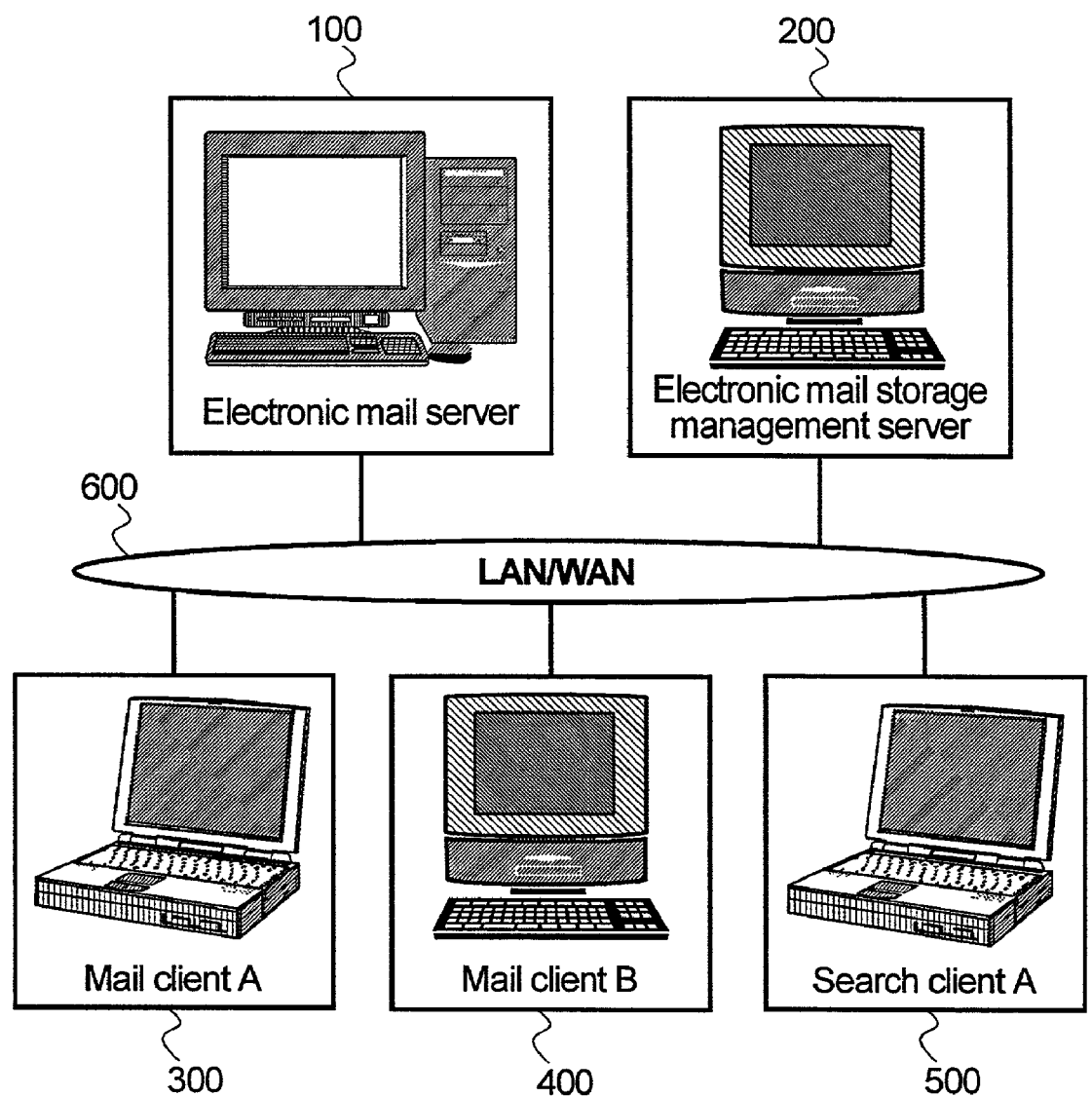
FIG. 1 is a simplified diagram illustrating the architecture of a first exemplary embodiment of a system according to the present invention.

The present invention in the form of one or more exemplary embodiments will now be described. FIG. 1 shows the overall architecture of a first exemplary embodiment of an electronic mail storage management system according to the present invention. As shown in FIG. 1, the electronic mail storage management system of this embodiment includes an electronic mail server 100, an electronic mail storage management server 200, mail clients 300 and 400, a search client 500, and a network 600.

The electronic mail server 100 receives electronic mail messages sent from mail clients 300 and 400 and routes them to the destination users. The electronic mail format used by the electronic mail server 100 is generally SMTP (Simple Mail Transfer Protocol). However, it should be understood that other electronic mail server-specific formats, such as, formats based on X.400, can be used.

The electronic mail storage management server 200 is a server that receives electronic mail messages from the electronic mail server 100 for storage in a task history database (not shown).

A number of methods can be used by the electronic mail server 100 to send electronic mail messages to the electronic mail storage management server 200. For example, an electronic mail address for the electronic mail storage management server 200 can be appended to the destination addresses of electronic mail messages sent by the mail clients 300 and 400.

At the mail clients 300 and 400, end users are able to send and/or receive electronic mail messages via the electronic mail server 100. The mail clients 300 and 400 can be personal computers or portable terminals or devices, such as, portable phones. Based on the disclosure provided herein, a person of ordinary skill in the art will know of other ways and/or methods to implement the mail client 300 or 400. An illustrative architecture in which two mail clients 300 and 400 are connected is shown in FIG. 1, but it should be understood that it would also be possible to connect three or more mail clients within the electronic mail storage management system in accordance with the present invention.

The search client 500 has a display screen which allows a user to interactively specify search conditions in a search request or command. The search request specified by the user is relayed to and interpreted by the electronic mail storage management server 200. The search request is sent to the electronic mail storage management server 200 via the network 600.

At the electronic mail storage management server 200, search operations in response to the search request received from the search client 500 is performed. The electronic mail storage management server 200 then forwards the search results to the search client 500 which then presents the user with the search results in a search results screen. The search client 500 can be a personal computer or a portable terminal or device, such as, a portable phone. Based on the disclosure provided herein, a person of ordinary skill in the art will know of other ways and/or methods to implement the search client 500. An illustrative architecture in which a single search client 500 is connected is shown in FIG. 1, but it should be understood that it would also be possible to connect two or more search clients within the electronic mail storage management system in accordance with the present invention.

The network 600 is formed using a local area network (LAN) or a wide area network (WAN) and is used to pass data and commands between the electronic mail server 100, the electronic mail storage management server 200, the mail clients 300 and 400 and the search client 500. Based on the disclosure provided herein, a person of ordinary skill in the art will know of other ways and/or methods to implement the network 600.

In FIG. 1, it is shown that the electronic mail server 100 and the electronic mail storage management server 200 are implemented as separate terminals, with electronic mail messages or data being sent via the network 600. However, it should be understood that these elements can be alternatively implemented in a single terminal.

Also, as shown in FIG. 1, the search client 500 is implemented separately from the mail clients 300 and 400, but it should be understood that it would also be possible to implement these elements in a single terminal.

Figure 2:
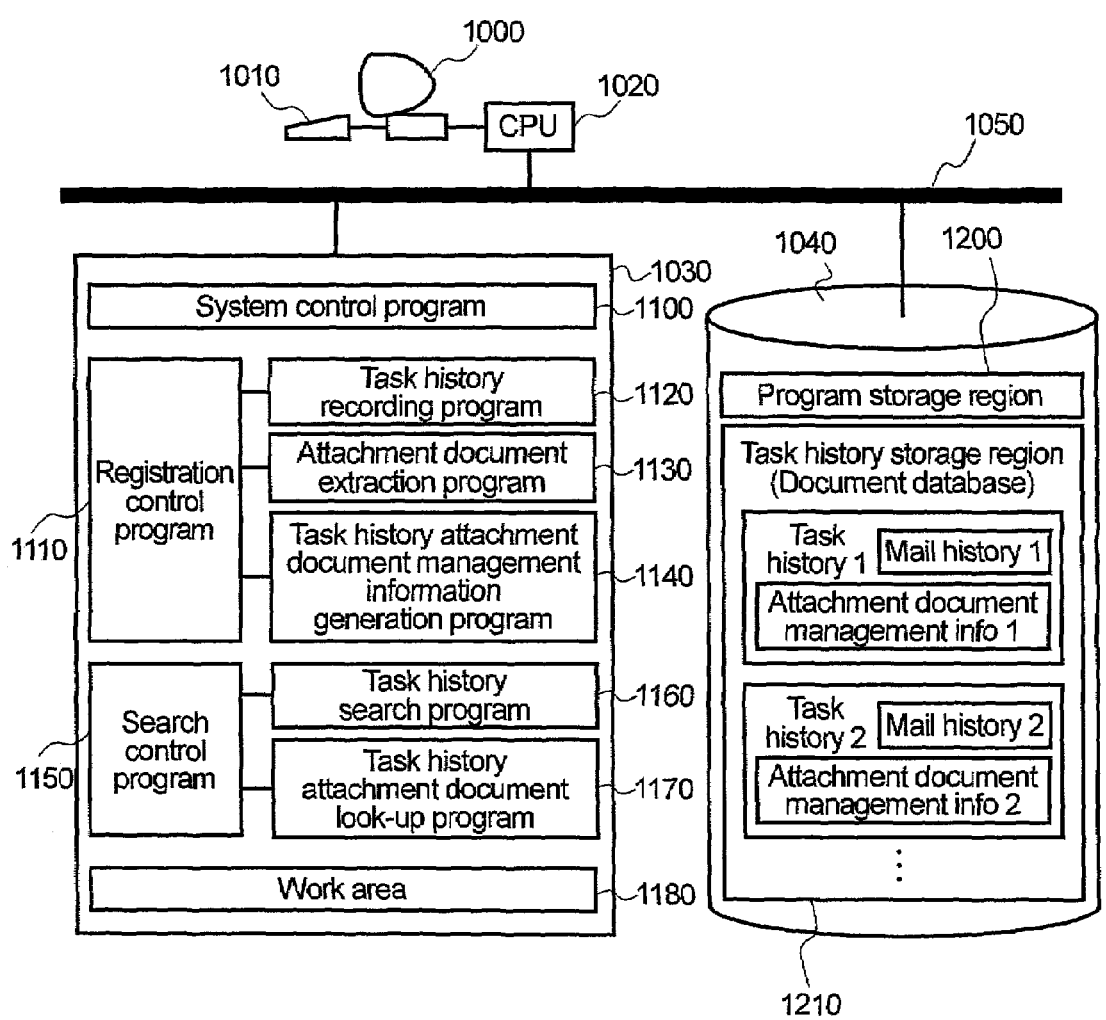
FIG. 2 is a simplified block illustrating the architecture of an electronic mail storage management server according to the first exemplary embodiment of the present invention.
Figures 3, 4:
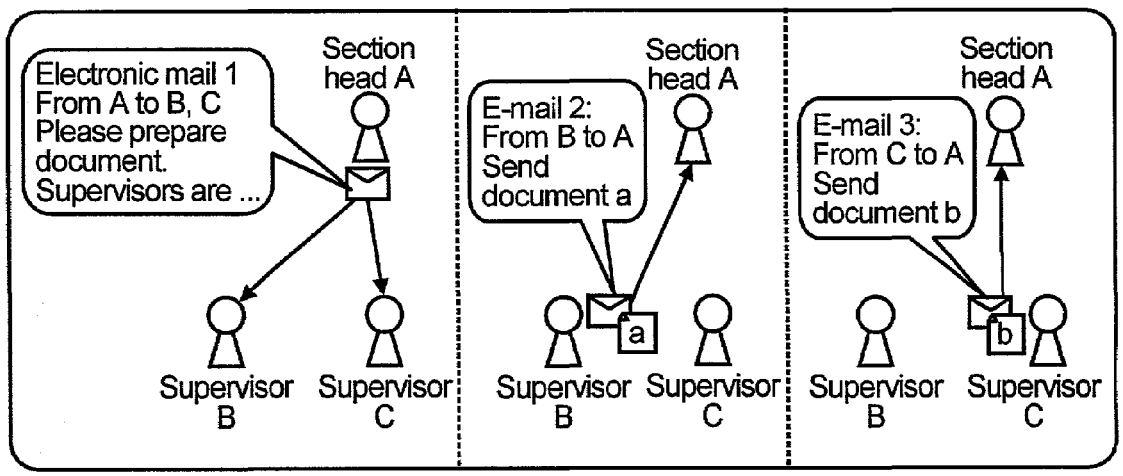
FIG. 3 is a simplified diagram illustrating a sample exchange of task documents using electronic mail.
FIG. 4 is a simplified diagram showing an example of an incoming electronic mail screen.

Next, the electronic mail storage management server 200 is described in further details FIG. 2 shows the architecture of an exemplary embodiment of the electronic mail storage management server 200. As shown in FIG. 2, the electronic mail storage management server 200 includes: a display 1000 for displaying execution status of operations and the like, a keyboard 1010 for entering registration commands and the like, a CPU 1020 for executing registration operations and search operations, a main memory 1030 for storing registration programs and data on a temporary basis, a magnetic disk 1040 for storing data and programs; and a bus 1050 for connecting the foregoing elements.

A number of programs are loaded from a program storage region 1200 on the magnetic disk 1040 to the main memory 1030 including: a system control program 1100; a registration control program 1110; a task history recording program 1120; an attachment document extraction program 1130; a task history attachment document management information generation program 1140; a search control program 1150; a task history search program 1160; and a task history attachment document look-up program 1170. It should be understood that these programs as described above are classified on a functional basis. When implemented, these programs can be arranged in a modular or integrated manner, i.e., one or more programs may be combined together. Based on the disclosure provided herein, a person of ordinary skill in the art will know of various ways and/or methods to implement these programs in accordance with the present invention. The main memory 1030 also includes a work area 1180. The magnetic disk 1040 further includes the program storage region 1200 and a task history storage region 1210.

In this exemplary embodiment, these storage regions 1200 and 1210 are placed on the magnetic disk 1040, but it should be understood that it would also be possible to use other types of secondary storage devices, such as, a magneto-optical disk device or the like.

Next, the procedures for registering electronic mail data in this exemplary embodiment will be described. First, the electronic mail storage management server 200 receives electronic mail messages being sent between end users from the electronic mail server 100. The system control program 1100 in the electronic mail storage management server 200 runs the registration control program 1110 and begins the procedure for registering information relating to the received electronic mail messages in the task history storage region 1210 as task history information.

Figure 5:
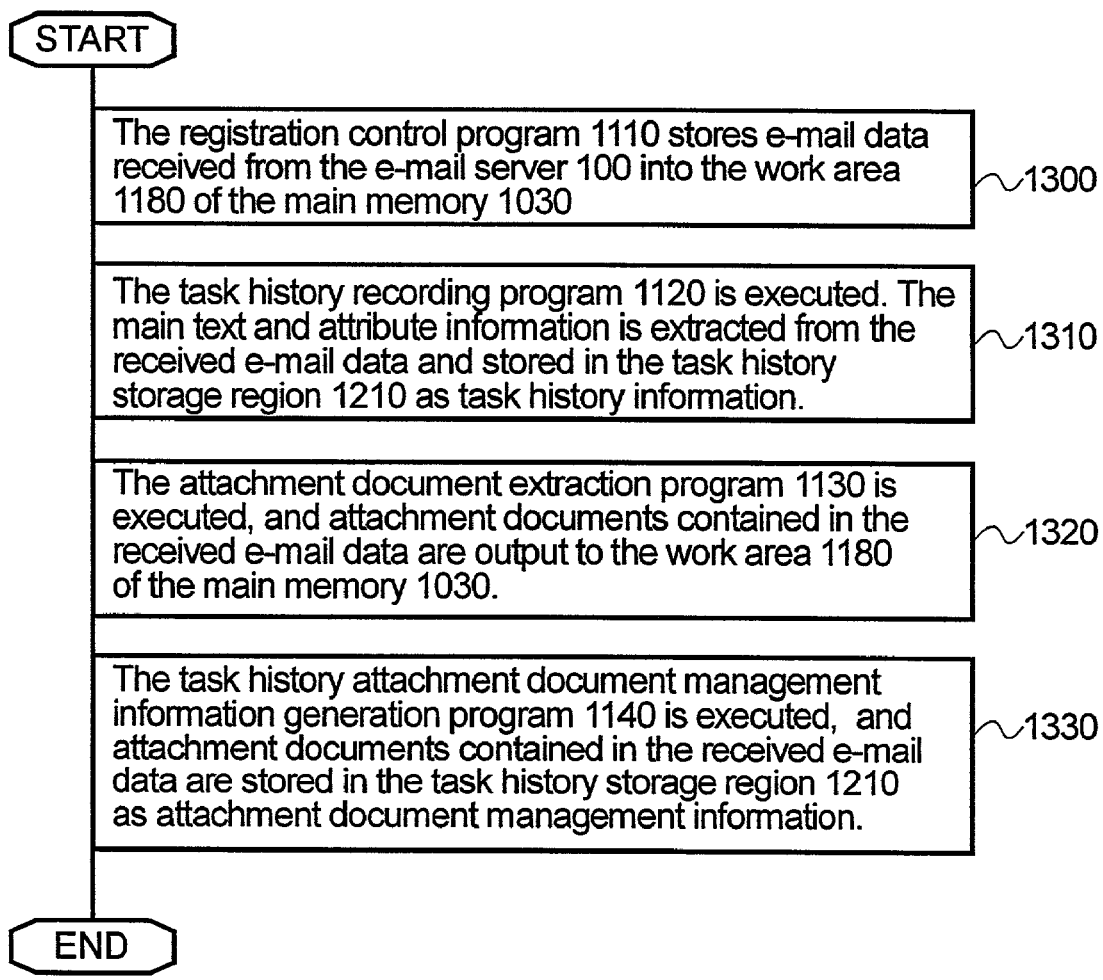
FIG. 5 is a simplified diagram illustrating the flow of operations performed for task history registration according to a first exemplary embodiment of the present invention.

The operations performed to register and store task history information are described in FIG. 5. As illustrated in FIG. 5, first, at step 1300, the registration control program 1110 stores the electronic mail message received from the electronic mail server 100 in the work area 1180 of the main memory 1030. Then, at step 1310, the task history recording program 1120 is executed to extract the main text and attribute information from the electronic mail message in the work area 1180. The extracted information is stored as task history information in the task history storage region 1210 of the magnetic disk 1040. Then, at step 1320, the attachment document extraction program 1130 is executed to analyze each electronic mail message stored in the work area 1180 of the main memory 1030 so that any attached document(s) can be extracted. The extracted document(s) is output to the work area 1180 of the main memory 1030. Finally, at step 1330, the task history attachment document management information generation program 1140 is executed. This generation program 1140 examines the extracted document(s) and generates or updates the appropriate attachment document management information for the task history.

Figure 6:
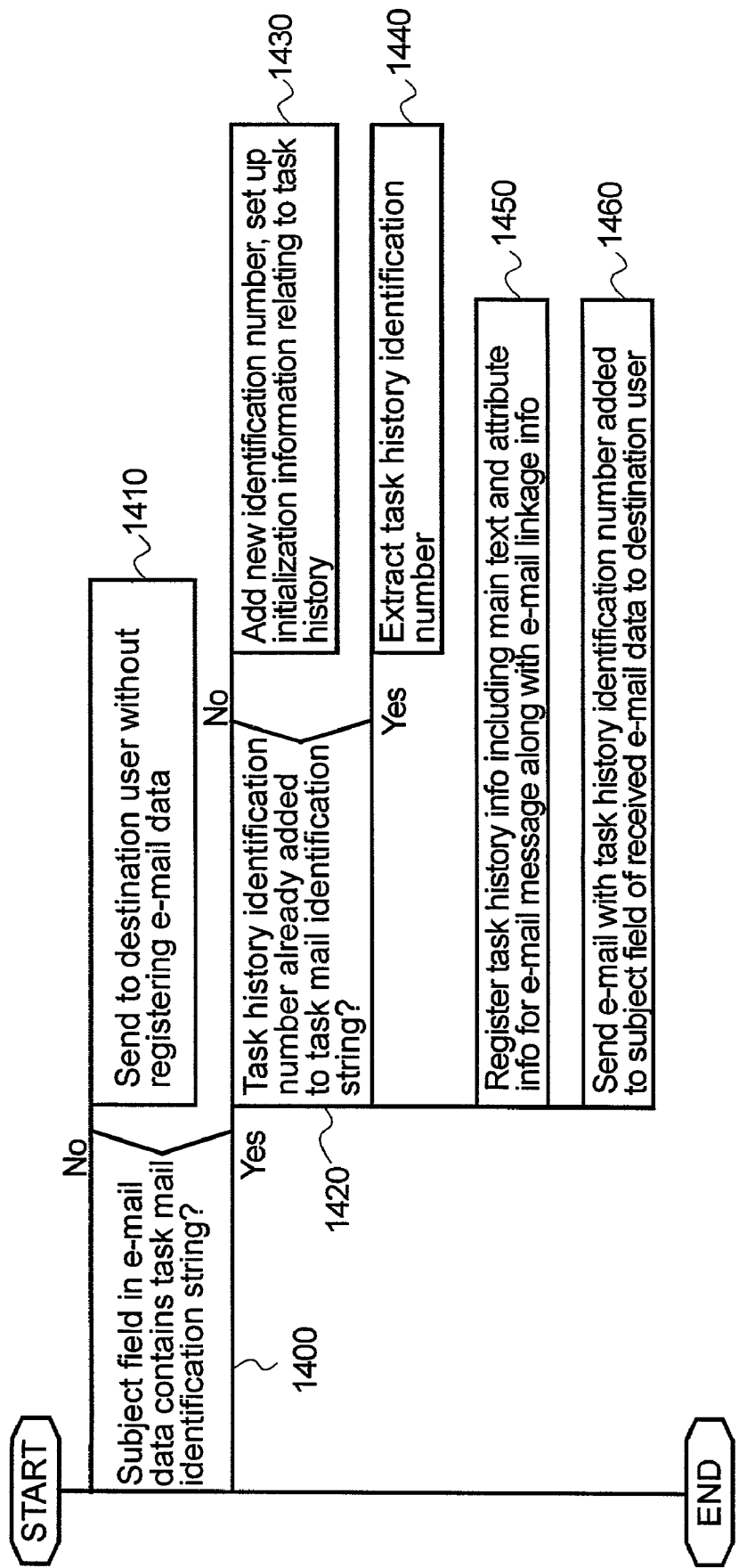
FIG. 6 is a simplified diagram illustrating the flow of operations performed by a task history recording program according to a first exemplary embodiment of the present invention.
Figure 7:
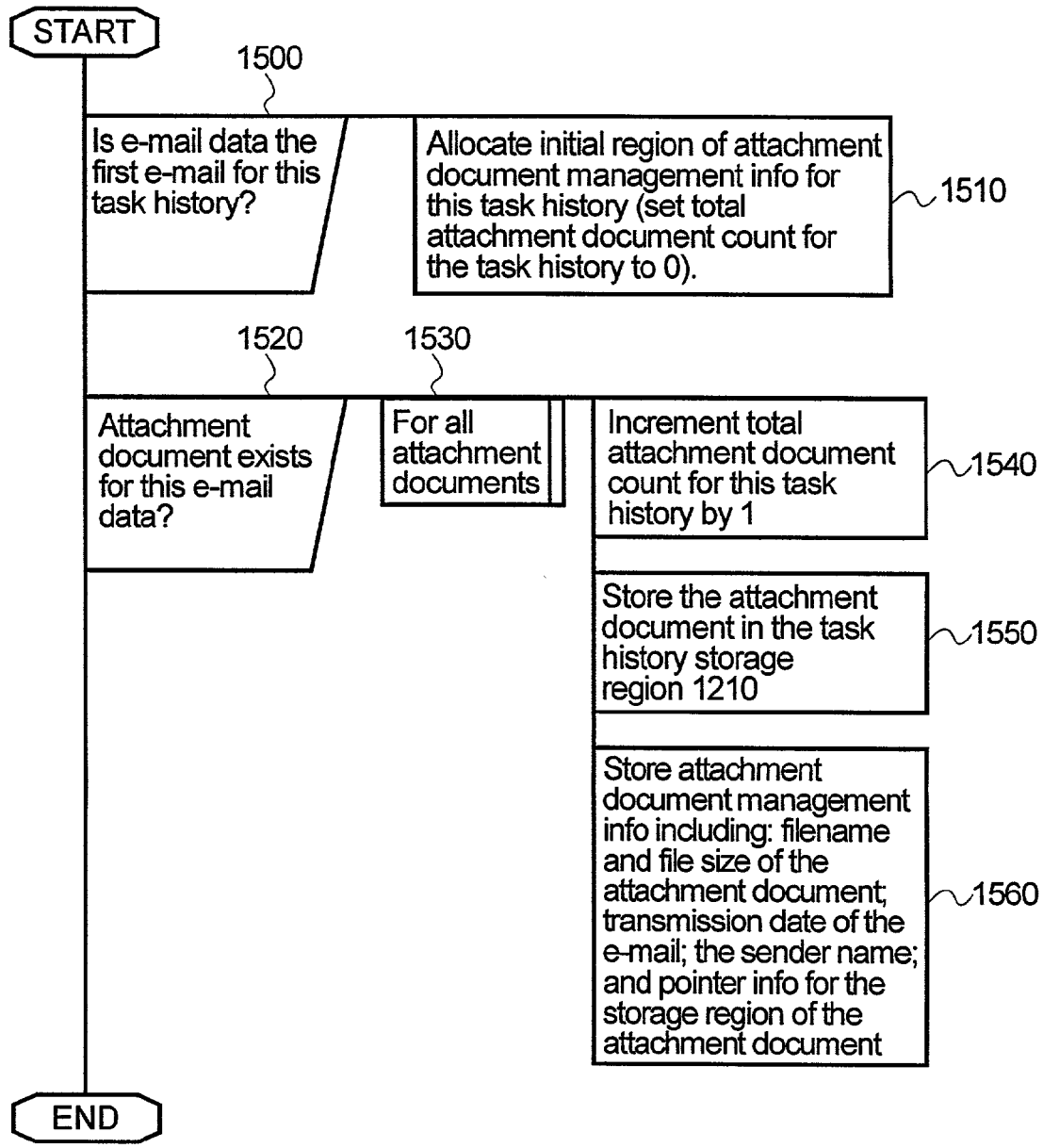
FIG. 7 is a simplified diagram illustrating the flow of operations performed by a task history attachment document management information generation program according to a first exemplary embodiment of the present invention.

The operations performed by the task history recording program 1120 and the task history attachment document management information generation program 1140 shown in FIG. 5 are described using FIG. 6 and FIG. 7. First, at step 1400 in FIG. 6, the task history recording program 1120 analyzes the subject field or line of each electronic mail message stored in the work area 1180 and determines whether a predetermined identification string is present in the subject field to indicate that the electronic mail message is a task message. It will be appreciated by a person of ordinary skill in the art that different criteria can be used to analyze the subject field and determine whether the electronic mail message is a task message depending on the specific design and requirements of the electronic mail storage management system. If this determination indicates that no identification string is present in the subject field, control proceeds to step 1410, where the electronic mail message is sent to the destination user without performing any registration operations.

If the determination indicates that an identification string is present in the subject field, the electronic mail message is assumed to be a task message that is to be registered in the database. The series of operations starting with step 1420 are then executed. At step 1420, the identification string of the task message is checked to see if it contains a task history identification number. If not, control proceeds to step 1430. At step 1430, a new task history identification number is chosen and assigned to represent the task history for this task message, and initialization information is set up for this task history.

If the task message has an associated task history identification number, i.e., a task history identification number has already been added, control proceeds to step 1440. At step 1440, the task history identification number is extracted from the identification string of the task message in the subject field. Then, step 1450 is executed and the text and the attribute information for the electronic mail message is registered as information for the task history. Then, electronic mail identification or linkage information and the like relating to reference source electronic mail indicated in the electronic mail data header information are extracted. This provides reference information (information indicating the past electronic mail message to which the current electronic mail message is a reply), which is also registered as information relating to the task history in the task history storage region 1210 of the magnetic disk 1040. It should be understood that the type of information that is to be extracted and registered as task history information may vary depending on the design and requirements of each implementation. A person of ordinary skill in the art will know of other ways and/or methods to determine what appropriate information is to be stored as task history information in accordance with the present invention. Also, index data (not shown in FIG. 2) is created and updated to allow searching of the task history and the electronic mail message. A person of ordinary skill in the art will know of various ways and/or methods to organize the indexing of task history information and electronic mail messages. Finally, step 1460 is executed. If no task history identification number is added to the subject field of the electronic mail message, the subject field is processed to generate an electronic mail message containing the task history identification number. If a task history identification number is already included in the subject field, the subject field is left intact and the electronic mail message is sent to the destination user.

Next, the flow of operations performed by the task history attachment document management information generation program 1140 are described in FIG. 7. In the task history attachment document management information generation program 1140, step 1500 in FIG. 7 determines whether or not the current electronic mail message is the first electronic mail message associated with a task history. If so, step 1510 is executed and an initial region for attachment document management information for the task history is allocated. The total number of attachment documents associated with this task history is set to zero (0). Step 1520 is then executed to determine whether an attachment document associated with the current electronic mail message has been placed in the work area 1180 as output from the attachment document extraction program 1130. If so, step 1530 is executed and the series of operations from step 1540 through step 1560 are executed for all attachment documents attached to the current electronic mail message. In step 1540, for each attachment document processed, the total attachment document count for the task history associated with the current electronic mail message is incremented by one (1). At step 1550, the attachment document is stored in the task history storage region 1210 of the magnetic disk 1040. Finally, at step 1560, the filename and the file size of the attachment document is stored as attachment document management information along with the transmission time and the recipient name of the associated electronic mail message and pointer information (storage destination) indicating the storage region at which the attachment document was stored.

The operations performed to register documents according to this exemplary embodiment are further described using an example in which the electronic mail messages shown in FIG. 8 and FIG. 9 are received by the electronic mail storage management server 200. First, when the electronic mail message shown in FIG. 8 is received, the electronic mail message is stored in the work area 1180 of the main memory 1030 as described in step 1300 in FIG. 5. Then, as described in step 1310, the task history recording program 1120 is executed to analyze the subject field of the electronic mail message to determine whether an identification string is present in the subject field to indicate that the electronic mail message is a task message, as described in step 1400. In the present illustrative case, the electronic mail message is determined to be a task message on the basis that the identification string "[Competitor Survey . . . " is included in the subject field of the electronic mail message. It should be understood that the outcome of this determination is based on predetermined criteria that lead to the conclusion that an electronic mail message that contains an identification string having the characters "competitor survey" in its subject field is to be considered a task message. The predetermined criteria can be stored as a definition file against which the subject field of the electronic mail message is checked to determine if the electronic mail message is a task message. Since the electronic mail message is considered a task message, the presence of a task history identification number is then checked, as described in step 1420. Since no identification number has been added yet, a new identification number "3" is added (assuming that identification numbers up to "2" have already been used), and initialization information for the task history is set up, as described in step 1430. Then, the task history recording program 1120 extracts the main text and attribute information from the electronic mail message and stores the extracted information as task history information in the task history storage region 1210 of the magnetic disk 1040, as described in step 1450. In the present illustrative case, the strings such as "To Supervisor B, Supervisor C, . . . " are extracted as the main text of the electronic mail message. Electronic mail attribute information is extracted by extracting information such as the sender "A@hitachi.co.jp", the recipients "B@hitachi.co.jp" and "C@hitachi.co.jp", as well as the message ID, the date, the subject field, and the like. These are stored in the task history storage region 1210 of the magnetic disk 1040 as data associated with electronic mail messages in the task history "3". The task history identification number is then added to the subject field of the electronic mail message to generate an electronic mail message with the subject field "[Competitor Survey: 3] Z Corp. Survey", as described in step 1460. The revised electronic mail message is then sent to the destination users and the execution of the task history recording program 1120 is concluded.

Next, the attachment document extraction program 1130 is executed, as described in step 1320. However, nothing is output in the present case since the electronic mail message (as shown in FIG. 8) does not contain any attachment documents. The task history attachment document management information generation program 1140 is then executed, as described in step 1330. More specifically, as described in step 1500, the electronic mail message is checked to see if it is the first electronic mail message relating to the task history "3". In this case, the electronic mail message shown in FIG. 8 is the first electronic mail message in the task history "3", so the evaluation result is "Yes" and step 1510 is executed. That is, an initial region is allocated in the task history storage region 1210 for attachment document information for the task history "3", and the total attachment document count for the task history "3" is set to zero (0). Next, at step 1520, a determination is made as to whether attachment documents associated with the electronic mail message have been output to the work area 1180. Since there is no attachment document in this case, this evaluation results in a "No", and the execution of the task history attachment document management information generation program 1140 is terminated without executing the series of operations as described in step 1530 through step 1560.

A further example in which Supervisor B replies to the electronic mail message shown in FIG. 8 with the electronic mail message shown in FIG. 9 is provided. As in the case above, this electronic mail message is stored in the work area 1180 of the main memory 1030, as described in step 1300. Then, the task history recording program 1120 is executed, as described in step 1310. Similarly, the task history recording program 1120, as described in step 1400, determines that the electronic mail message is a task message since the identification string "[Competitor Survey . . . " is included in the subject field of the electronic mail message. Again, the presence of a task history identification number is checked, as described in step 1420. A task history identification number is present because this electronic mail message is a reply to the electronic mail message shown in FIG. 8 which has been revised to include the task history identification number in the subject field. Since an identification number is included this time, the task history identification number "3" is retrieved from the subject field of the electronic mail message, as described in step 1440. Then, as described in step 1450, the strings such as "To Section Head A Cc Supervisor C, . . . " are extracted as the main text of the electronic mail message. Electronic mail attribute information is extracted by extracting information such as the sender "B@hitachi.co.jp", the recipient "A@hitachi.co.jp", the cc'ed user "C@hitachi.co.jp", as well as the message ID, the date, the subject field, and the like. These are stored in the task history storage region 1210 of the magnetic disk 1040 as data associated with electronic mail messages in the task history "3". Then, as described in step 1460, since the task history identification number has already been added to the subject field of the electronic mail message, the electronic mail message with the subject field "Re: [Competitor Survey: 3] Z Corp. Survey" is sent to the destination users and the execution of the task history recording program 1120 is concluded.

Next, the attachment document extraction program 1130 is executed, as described in step 1320, and the document named "Z Corp. Management.txt" that is associated with the electronic mail message is output to the work area 1180 of the main memory 1030 as an attachment document. The task history attachment document management information generation program 1140 is executed, as described in step 1330. More specifically, as described in step 1500, the electronic mail message is checked to see if it is the first electronic mail message relating to the task history "3". In this case, since the electronic mail message shown in FIG. 9 is not the first electronic mail message associated with the task history "3", the evaluation result is "No" and step 1510 is not executed.

A determination is then made as to whether attachment documents associated with this electronic mail message has been output to the work area 1180 of the main memory 1030, as described in step 1520. In this example, the attachment document "Z Corp. Management.txt" has been output, so the evaluation result is "Yes" and step 1530 is executed. Since the total attachment document count is "0" at this point, the total attachment document count is incremented by "1", as described in step 1540. At step 1550, the attachment document associated with "Z Corp. Management.txt" is stored as the first attachment for the task history "3" in a directory with a name such as "3-1". Finally, step 1560 is executed, and the following information is registered as attachment document management information associated with the task history "3": the attachment document filename "Z Corp. Management.txt"; the file size of the attachment document, e.g., 1 kB if the attachment document has a file size of 1 kB; the electronic mail transmission date "Jun. 4, 2001 10:15:

26"; the sender "B"; and pointer information for the attachment document, i.e., the directory name "3-1" under which the file was stored. The task history attachment document management information generation program 1140 is then exited. Then if, after this electronic mail message, Supervisor C replies to the electronic mail message shown in FIG. 8 with a 2 kB attachment document titled "Z Corp. Products.txt" sent "Jun. 4, 2001 11:23:36", the data shown in FIG. 10 is registered as the attachment document management information for the task history 3.

The operations performed by the electronic mail storage management server 200 for searching electronic mail messages and task histories according to this exemplary embodiment will now be described. Referring to FIG. 1, when the electronic mail storage management server 200 receives a search request from the search client 500, the system control program 1100 runs the search control program 1150 in response to the search request. The search display operation is begun by looking up the data stored in the task history storage region 1210.

Figure 11:
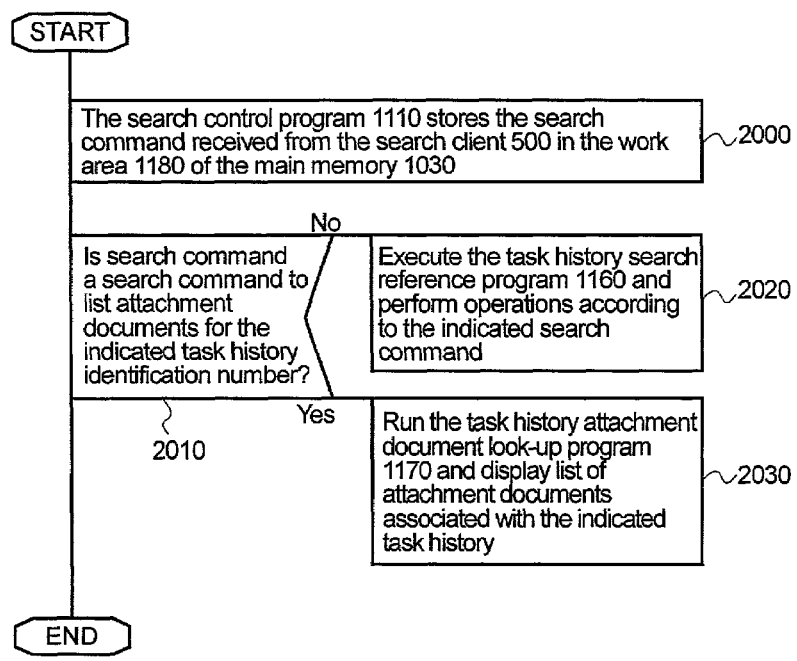
FIG. 11 is a simplified diagram illustrating a flow of operations performed in a search operation according to a first exemplary embodiment of the present invention.

The operations performed to search and display task history information are described in FIG. 11. First, at step 2000, the search control program 1150 stores the search request received from the search client 500 in the work area 1180 of the main memory 1030. Then, at step 2010, it is determined if the search request is intended to retrieve a list of attachment documents associated with an indicated task history identification number. If the determination result at step 2010 is "No", then at step 2020 the task history search program 1160 is initiated and operations that are needed to effectuate the search request are executed. If the determination result at step 2010 is "Yes", at step 2030, the task history attachment document look-up program 1170 is executed and a list of attachment documents associated with the indicated task history is generated. The list of attachment documents generated here is sent back to the search client 500 via the search control program 1150 and the system control program 1100. The desired list of attachment documents is then displayed on the search screen of the search client 500.

Figure 12:
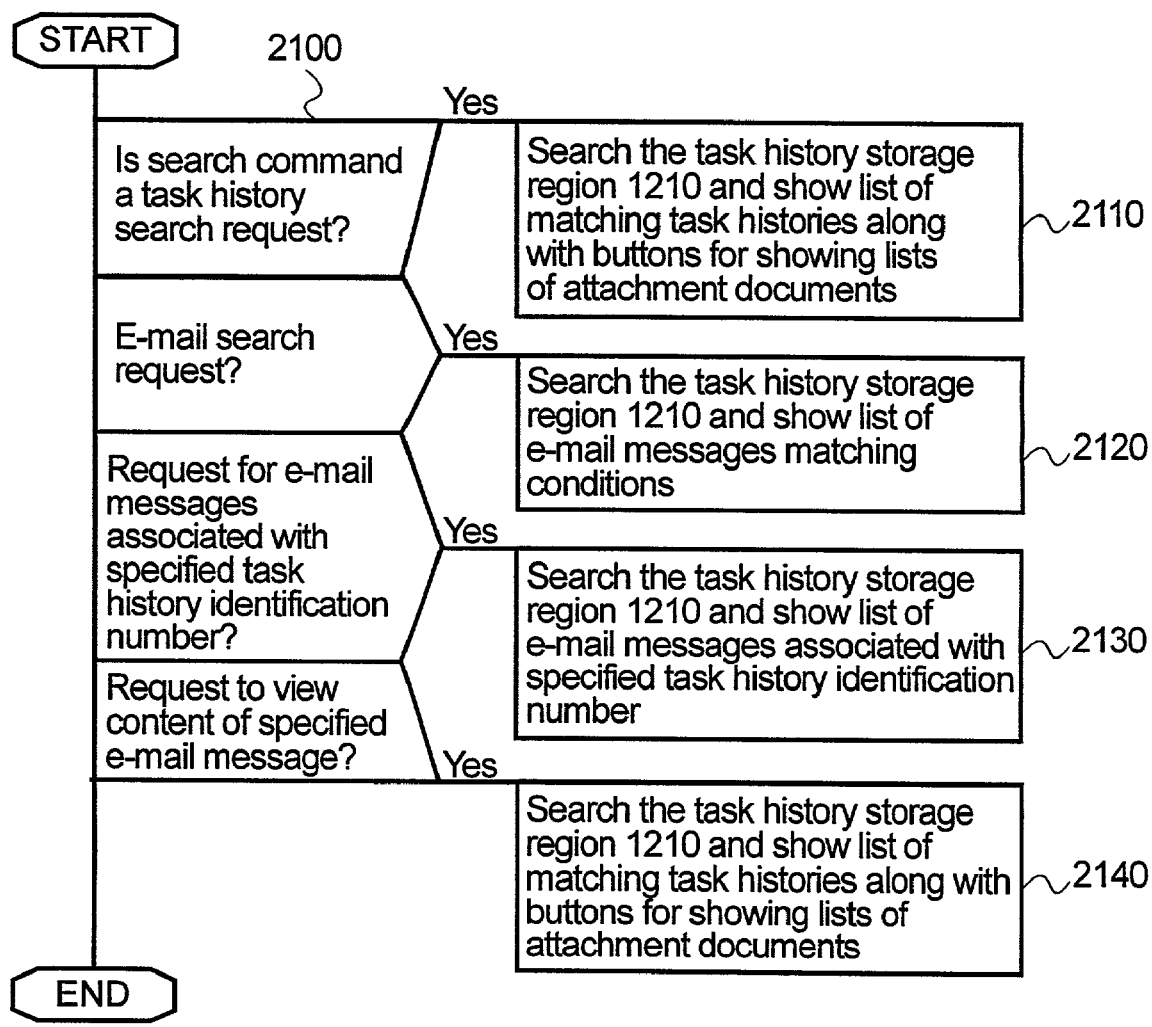
FIG. 12 is a simplified diagram illustrating a flow of operations performed by a task history search program according to a first exemplary embodiment of the present invention.
Figure 13:
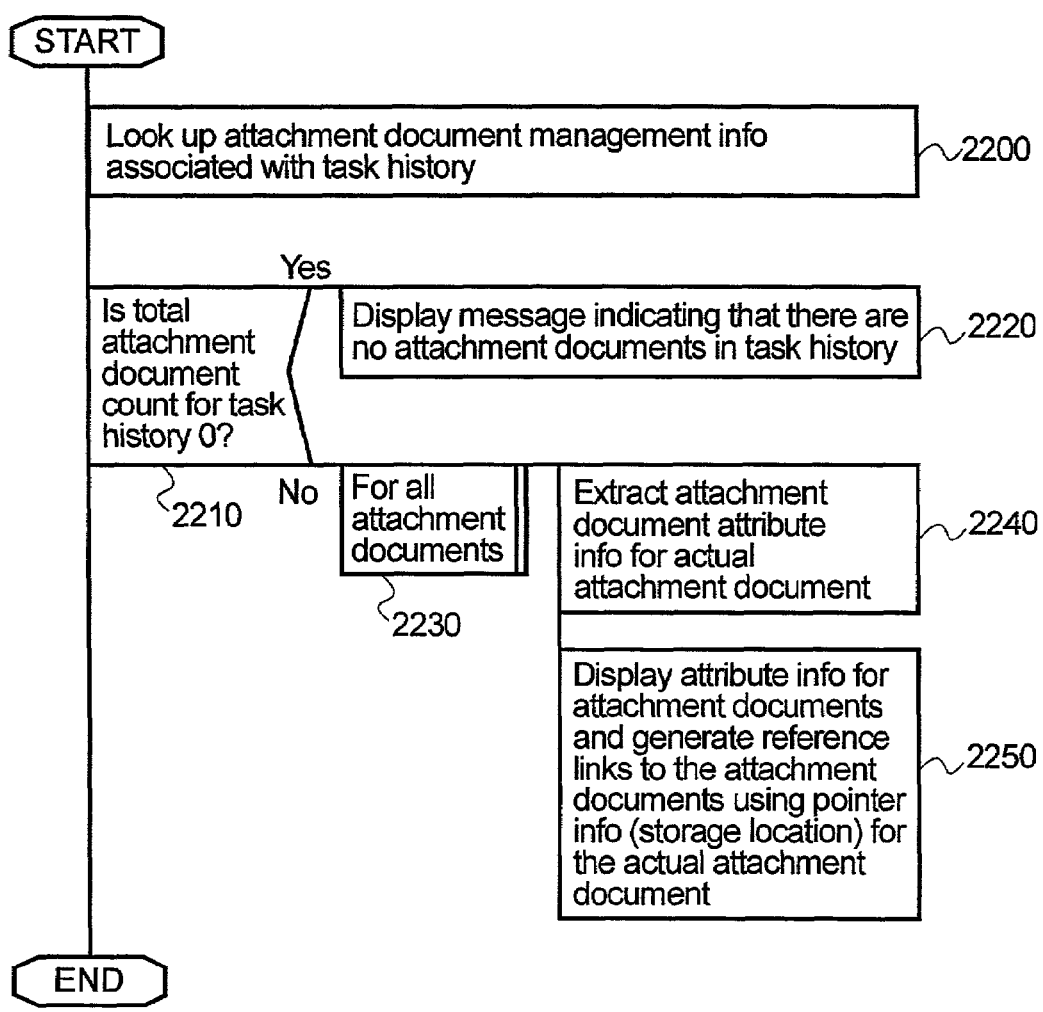
FIG. 13 is a simplified diagram illustrating a flow of operations performed by a task history attachment document management information look-up program according to a first exemplary embodiment of the present invention.

The operations performed by the task history search program 1160 at step 2020 in FIG. 11 and the operations performed by the task history attachment document look-up program 1170 at step 2030 in FIG. 11 are further described using FIG. 12 and FIG. 13 respectively. First, at step 2100 in FIG. 12, the task history search program 1160 evaluates the search request received from the search client 500 and stored in the work area 1180. If the evaluation result at step 2100 indicates that the search request relates to task histories, at step 2110, the search index data (not shown in FIG. 2) for task histories are looked up in the task history storage region 1210. A task history search operation based on the indicated search conditions is executed, and the retrieved search results are shown on a display screen. More specifically, the display screen shows a list of task histories that meet the specified search conditions. Each task history from the list of task histories can be expanded to show the list of attachment documents associated with that task history.

If, at step 2100, it is determined that the search request relates to electronic mail messages, then at step 2120 search index data for electronic mail messages are examined. An electronic mail search operation based on the indicated search conditions is executed, and a list of electronic mail messages meeting the specified conditions is generated and displayed.

If, at step 2100, it is determined that the search request is for a list of electronic mail messages associated with an indicated task history identification number, then at step 2130 an electronic mail message history associated with the indicated task history identification number is looked up and a list of the relevant electronic mail messages is generated and displayed.

Finally, if at step 2100 it is determined that the search request is for contents of an indicated electronic mail message, then at step 2140 the contents of the indicated electronic mail message are located in the task history storage region 1210 and then displayed appropriately.

The flow of operations performed by the task history attachment document look-up program 1170 are further described in FIG. 13. First, at step 2200 in FIG. 13, the task history attachment document look-up program 1170 looks up attachment document management information associated with the indicated task history. Then, at step 2210, the total attachment document count associated with the task history is checked to see if it is zero (0). If the evaluation result at step 2210 is "Yes", then at step 2220, a message is generated to indicate that there are no attachment documents for the specified task history. If the evaluation result at step 2210 is "No", then at step 2230, step 2240 and step 2250 are repeatedly executed until all the attachment documents are processed. At step 2240, the attachment document management information for the task history in the task history storage region 1210 is looked up and retrieved including attribute information and the pointer information (storage destination) for the storage region where the attachment document is stored. Then, step 2250, all or part of the retrieved attachment document management information for the task history is displayed. A screen is generated for displaying a list of attachment documents for the specified task history and their respective information, with links generated based on the corresponding pointer information to allow the actual attachment documents to be retrieved.

The search operations according to this exemplary embodiment will be further illustrated using additional examples. First, the search client 500 accesses the electronic mail storage management server 200 and the search screen shown in FIG. 14 is displayed on the search client 500. In this example, "A" is entered in the "Task history initiator" field, and the "Search" button is pressed. The search request is sent to the electronic mail storage management server 200 via the network 600, and the system control program 1100 executes step 2000 as shown in FIG. 11. A search request indicating a search for task histories in which "A" is contained in the "Task history initiator" field is stored in the work area 1180 of the main memory 1030. Next, an evaluation operation is performed as described in step 2010. Since the evaluation result in this case is "No", the task history search program 1160 is executed, as described in step 2020. As described in step 2100 in FIG. 12, the task history search program 1160 evaluates the indicated search request. Since the search request is a task history search request, step 2110 is executed. A list of task histories in which "A" is included in the "Task history initiator" field is generated, and buttons for looking up lists of attachment documents for the respective task histories are displayed on the screen.

An illustrative task history search result list is shown in FIG. 15. The "View attachments" command can be used to view the respective lists of attachment documents associated with the task histories. In this screen, links are generated for the "Task history name" field and the "Command" field. For example, if the user of the search client 500 clicks the link for "View attachments" under "Command", the search client 500 sends the electronic mail storage management server 200 a search request for looking up a list of attachment documents for the task history associated with the identification number "3". In this case, the evaluation result obtained as described in step 2010 in FIG. 11 is "Yes". As a result, step 2030 is executed and the task history attachment document look-up program 1170 is started. As described in step 2200 in FIG. 13, the task history attachment document look-up program 1170 looks up the information shown in FIG. 10, i.e., the attachment document management information for the task history. Next, an evaluation operation is performed as described in step 2210. In this case, the total attachment document count is two (2), so the evaluation result is "No". As a result, step 2230 is executed, and step 2240 and step 2250 are executed for the attachment documents associated with the identification number "3", i.e., "Z Corp. Management.txt" and "Z Corp. Products.txt".

FIG. 16 shows an example of a screen showing a list of attachment documents generated as a result of the above operations. In this figure, links are generated for the "Z Corp. Management.txt" and "Z Corp. Products.txt" entries under the "Attachment document name" field. The links are associated with the "3-1" and "3-2" directories where the attachment documents are stored. By clicking on these links, the attachment documents can be viewed. The list of attachment documents in this figure can be sorted by filename or chronologically by the date on which the electronic mail message containing the attachment document was sent.

If a link under the "Task history name" field in the list of task history search results shown in FIG. 15 is clicked, a search request is issued by the search client 500 to view a list of electronic mail messages associated with the task history having the identification number "3". In this case, the evaluation result as described at step 2110 in FIG. 12 is the request to view a list of electronic mail messages associated with the indicated task history identification number. As a result, step 2130 is executed, and a screen showing a list of electronic mail messages associated with the identification number "3" is sent to the search client 500.

The screen from this example is shown in FIG. 17. If the link for "Z Corp. Survey" under the "Subject" field in the electronic mail list screen for the task history "3" shown in FIG. 17 is clicked, the search client 500 issues a search request to view the content of the electronic mail message. As a result, the evaluation as described in step 2110 in FIG. 12 indicates a request to view the content of the indicated electronic mail message, and the content display screen for the electronic mail message is sent at step 2140. FIG. 18 shows a sample screen for this case.

Finally, an example in which electronic mail search conditions are entered in the search screen shown in FIG. 14 will be described. For example, "A" can be entered in the "Electronic mail sender" field and the "Search" button can be pressed. A search request is sent to the electronic mail storage management server 200. As described in step 2100 in FIG. 12, the search request is evaluated as an electronic mail search request, and step 2120 is executed. A list of electronic mail messages containing "A" in the "E-mail sender" field is then generated. FIG. 19 shows a sample screen displayed for this case. In this figure, a link is generated for "Z Corp. Survey" under the "Subject" field. If this link is clicked, a command to view the contents of the electronic mail message is issued by the search client 500. It will be appreciated by a person of ordinary skill in the art that the operations performed here are similar to those that have been presented above.

In the exemplary embodiment as described above, task histories are formed from groups of electronic mail messages that are associated with each other through forwarding, replying, and the like. When electronic mail messages are registered, task history attachment document management information is generated by storing attributes of attachment documents included in the task history. When search operations are performed, the screen showing the list of task histories includes buttons that allow viewing of lists of attachment documents associated with the task histories. This allows attachment documents associated with a task history to be viewed directly without having to go through individual electronic mail messages. As a result, the burden involved in viewing attachment documents can be significantly reduced.

In addition, a method for directly searching individual attachment documents can also be implemented. This function can be implemented by adding a step for generating search index data for each attachment document at step 1450 in FIG. 6. Also, a step is added at step 2100 in FIG. 12 for identifying attachment document search requests, and an operation to search according to the search request is added.

Also, in the exemplary embodiment as described above, the task history attachment document management information is generated based on information from various elements including the attachment document filename, the electronic mail transmission date, the sender, and the file size of the attachment document. By displaying the information for at least one of these elements, the complications involved in the conventional system in viewing attachment documents can be significantly reduced.

Optionally, more information can be added to provide more functionality in the displayed list of attachment documents. In the exemplary embodiment as described above, the transmission date is determined by directly using the "Date" field in the electronic mail message. However, the value of the "Date" field in the electronic mail message is dependent on the settings at the mail client 300 or 400 and may therefore be inaccurate. Alternatively, the date at which the electronic mail message was received by the electronic mail storage management server 200 can be used instead, thus providing a transmission date that is not dependent on mail client settings.

As shown in FIG. 15, the screen displaying the task history list does not include the total attachment document count. Optionally, the total attachment document count or information relating to the presence of attachment documents can be displayed on this screen. This can prevent needless searching for task histories that do not contain any attachment documents, thus providing more efficient attachment document viewing. Sample task history search result list screens for these cases are shown in FIG. 20 and FIG. 21. Furthermore, it would be possible as shown in FIG. 22 and FIG. 23 to not generate "View attachment document" links for task histories that contain no attachment document or to eliminate the "View attachment" link itself.

The above exemplary embodiment presents an example in which buttons to view attachment documents included in a task history are included only in the task history list screen shown in FIG. 15. However, it will be appreciated by a person of ordinary skill in the art that these buttons can also be included in the task history electronic mail list screen shown in FIG. 17, the electronic mail content display screen shown in FIG. 18, or the electronic mail search result screen shown in FIG. 19. Examples of these screens are shown in FIG. 24, FIG. 25, and FIG. 26, respectively. Buttons are displayed on the right side of the screen. When a button is pressed, the search client 500 issues a request to view attachment documents included in the task history. The results are displayed on the screen in FIG. 16.

In the above exemplary embodiment, the electronic mail storage management server 200 is implemented independent from the electronic mail server 100. However, it should be understood that since electronic mail messages associated with each other through replying, forwarding, and the like, are handled as a group, and the attachment documents exchanged within the group are managed in a unified manner, the electronic mail server 100 and the electronic mail storage management server 200 need not be independent. For example, in an electronic mail server based on a protocol such as X.400, the transferred electronic mail messages and attachment documents can be stored in the electronic mail server. In such cases, the electronic mail server can include a program for extracting electronic mail groups based on associations such as replying and forwarding as well as a program corresponding to the task history attachment document management information generation program 1140 of the present invention.

Furthermore, in the above embodiment, the electronic mail storage management server 200 is implemented independent from the mail clients 300 and 400. As in the above case, however, it should be understood that it would also be possible to have the mail client use a program for extracting electronic mail groups based on associations such as replying and forwarding implemented in a threaded display function or the like, as well as a program for extracting attachment documents and a program corresponding to the task history attachment document management information generation program 1140. In the search screens in this case, the "task history" concept is replaced by "mail threads", and would be implemented in a manner that is essentially similar to the screens shown for the exemplary embodiment starting with FIG. 14. In electronic mail list screens that include electronic mail threading, a button can be included to view a list of attachment documents for an electronic mail thread. Alternatively, a button can be displayed for each electronic mail message for viewing a list of attachment documents in the thread that the electronic mail message belongs to.

In the exemplary embodiment of the present invention presented above, a method is described wherein attachment documents attached to electronic mail message are extracted and management information for attachment documents is generated for electronic mail groups (task histories) in which the electronic mail messages are associated with each other by forwarding, replying, and the like. For electronic mail messages that include additional attachment documents for more advanced display functions, e.g., HTML mail, and messages to which attachment documents are automatically attached by the electronic mail storage management server 200 for control purposes, these attachment documents are registered as well.

Figure 27:
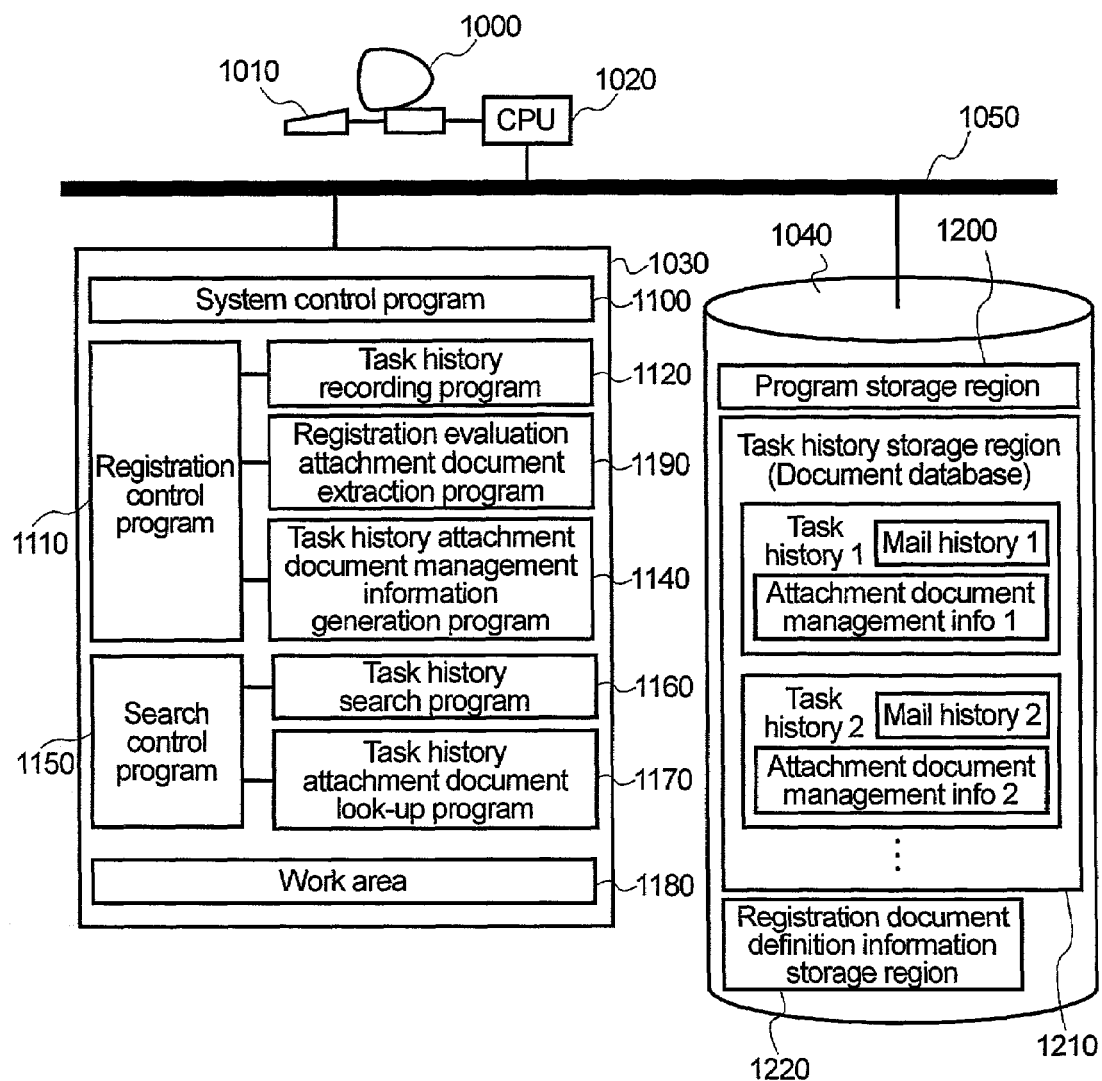
FIG. 27 is a simplified diagram illustrating the architecture of an electronic mail storage management server according to a second exemplary embodiment of the present invention.

In a second exemplary embodiment of the present invention, unnecessary or undesired attachment documents are excluded when generating task history attachment document management information. The architecture of this second exemplary embodiment is shown in FIG. 27.

The architecture of this second exemplary embodiment is similar to that of the first exemplary embodiment shown in FIG. 2 except for the substitution of the attachment document extraction program 1130 in FIG. 2 with a registration-checking attachment document extraction program 1190 and the inclusion of a registration document definition information storage region 1220 in the magnetic disk 1040.

Figure 28:
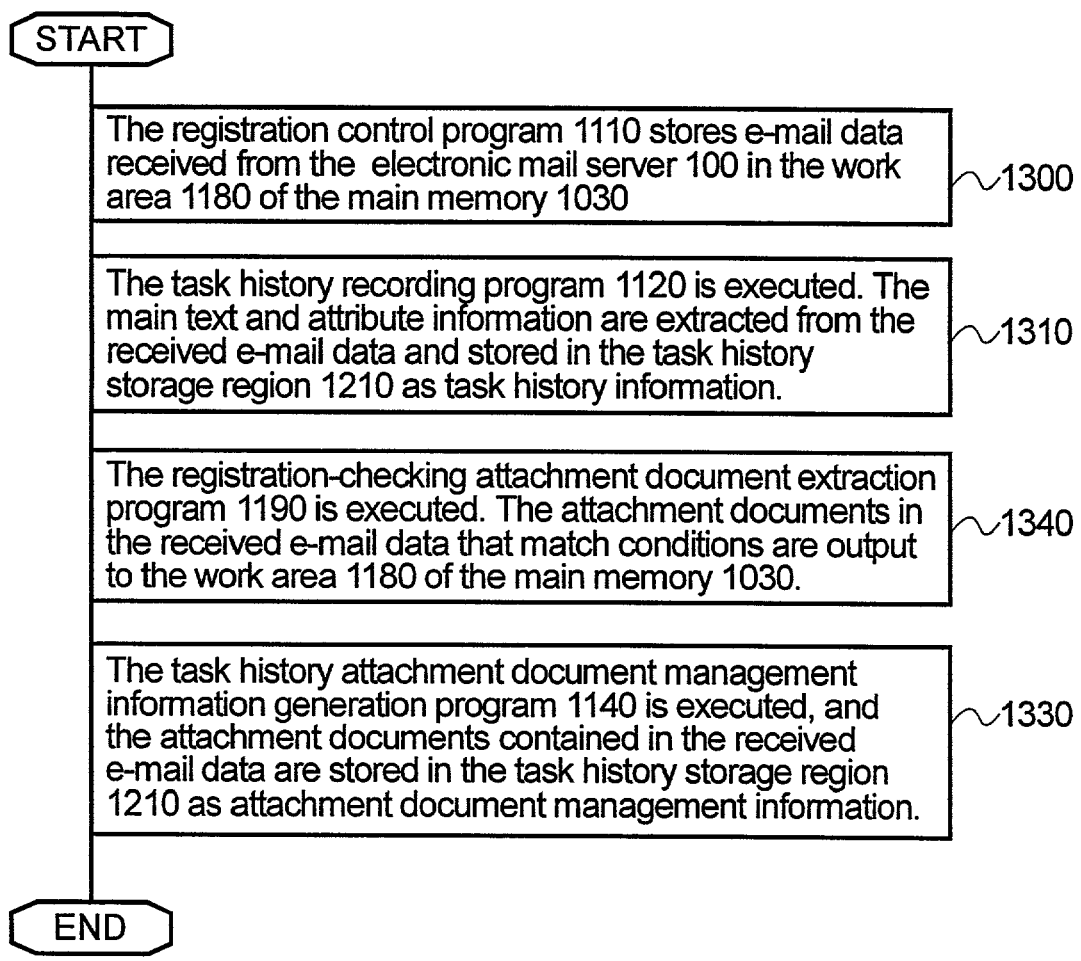
FIG. 28 is a simplified diagram illustrating the flow of operations performed to register task history according to a second exemplary embodiment of the present invention.

An overview of the registration operation in this second exemplary embodiment will be described. FIG. 28 shows a simplified diagram illustrating the operations performed when registering and storing task history information. In this figure, the flow of operations is essentially similar to that shown in FIG. 5 for the first exemplary embodiment except for the substitution of step 1320 in FIG. 5 with step 1340, and the execution of the registration-checking attachment document extraction program 1190 at step 1340.

The operations of the registration-checking attachment document extraction program 1190 are described using FIG. 29. At step 1600, the registration-checking attachment document extraction program 1190 checks the registration document definition information storage region 1220 on the magnetic disk 1040 and loads the registration document definition information in the work area 1180 of the main memory 1030. Then, at step 1610, the electronic mail message stored in the work area 1180 of the main memory 1030 is analyzed, and any attachment documents are extracted. Step 1620 executes step 1630 for each of the attachment documents to determine if the attachment documents correspond to the registration document definition information, which will be further described below. If the evaluation result at step 1630 is "Yes", step 1640 is executed, and the attachment document is output to the work area 1180 of the main memory 1030 as a document to be registered.

Under the second exemplary embodiment, the registration document definition information can be, for example, a definition of attachment document filenames that should not be extracted for registration. As a result, many of the attachment documents automatically attached by the electronic mail server 100 for control purposes can be excluded from registration. Furthermore, one or more attachment document extensions (e.g., the "txt" string in "Z Corp. Management.txt") can be defined for registration in the registration document definition information. Also, for attachment documents prepared as application data for personal computers, attribute information in the application data can be used in the definitions. As a result, the definition information can be used to determine document types, and only documents that have a high probability that they were generated as task documents can be processed for registration. Furthermore, in the registration document definition information, rules can be defined based on the electronic mail formats to be registered. As a result, storing and viewing of attachment documents can be limited to just the desired attachment documents, even if electronic mail messages include attachment documents that are provided for high-functionality displaying, e.g., HTML mail.

Furthermore, the registration document definition information can take the form of evaluation conditions for attachment documents to be registered, and an interface can be provided for setting up these evaluation conditions in the registration attachment definition information storage region. Alternatively, the registration document definition information can take the form of evaluation conditions for attachment documents to be excluded from registration, and an interface (e.g., a definition screen) can be provided for setting up these evaluation conditions in the registration attachment definition information storage region.

In a third exemplary embodiment of the present invention, attachment documents with identical contents are not attached multiple times in a task history. In this third exemplary embodiment, the attachment document extraction program 1130 or the registration-checking attachment document extraction program 1190 can check the registered attachment documents in a task history. If there is already an existing attachment document having the same contents as the attachment document of the electronic mail message currently being registered, the attachment document can be excluded from extraction. As a result, the number of documents in the attachment document list for an indicated task history can be efficiently reduced, and more efficient viewing of attachment documents can be provided.

In the first exemplary embodiment described above, the attachment documents in an indicated task history are sorted in the order that the attachment document was sent or received, as shown in FIG. 16. However, it should be understood that it would also be possible, as shown in FIG. 30, to display the entries by filename, thus making it relatively easier to find an attachment document associated with when a certain attachment document was sent.

Furthermore, in the sending and receiving of attachment documents via exchange of electronic mail messages, files in a series are often identified by including numbers or symbols in the filename. As shown in FIG. 31, the display method indicated in FIG. 30 can be used to provide grouped displays of attachment documents in which a certain section of the filenames differ. With this display method, attachment documents can be viewed even if certain section of the filenames of the attachment documents differ.

It should be understood that the present invention may be implemented in the form of control logic using software, hardware, or a combination of both, in a modular or integrated manner. The present invention can be implemented as a stand-alone system or as part of a larger computer system. Based on the disclosure provided herein, a person of ordinary skill in the art will know of other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for storing and management electronic mail, comprising:
   a memory to store the control logic configured to receive and store a plurality of electronic mail messages;
   control logic configured to extract and register text and attribute information from an electronic mail message as task history information, the task history information being associated with the electronic mail message;
   control logic configured to extract one or more attachment documents attached to the electronic mail message; and
   control logic configured to generate and store attachment document management information for the one or more extracted attachment documents.

2. The system of claim 1 further comprising:
   control logic configured to associate a task history identification number with the electronic mail message if the electronic mail message qualifies as a task mail;
   control logic configured to associate the task history information and linkage information with the task history identification number; and
   control logic to index the task history identification number.

3. The system of claim 2 further comprising:
   control logic configured to receive and execute a search request.

4. The system of claim 3 further comprising:
   control logic configured to retrieve a list of attachment documents associated with a first specified task history identification number when the search request is for the list of attachment documents associated with the first specified task history identification number;
   control logic configured to retrieve information associated with a second specified task history identification number when the search request is for the second specified task history identification number;
   control logic configured to retrieve a first list of electronic mail messages associated with a third specified task history identification number when the search request is for the first list of electronic mail messages associated with the third specified task history identification number;
   control logic configured to retrieve a second list of electronic mail messages if the search request is for the second list of electronic mail messages;
   control logic configured to retrieve a particular electronic mail message if the search request is for the particular electronic mail message; and
   control logic configured to retrieve a particular attachment document if the search request is for the particular attachment document.

5. The system of claim 4 further comprising:
   control logic configured to display information relating to the retrieved list of attachment documents associated with the first specified task history identification number and make available corresponding links for displaying attachment documents within the list of attachment documents associated with the first specified task history identification number.

6. The system of claim 4 further comprising:
   control logic configured to display the retrieved second list of electronic mail messages and make available corresponding links for viewing electronic mail messages within the second list of electronic mail messages.

7. An electronic mail management server comprising:
   a registration control module configured to receive and store a plurality of electronic mail messages;
   task history recording module configured to extract and register text and attribute information from an electronic mail message as task history information, the task history information being associated with the electronic mail message;
   an attachment document extraction module configured to extract one or more attachment documents attached to the electronic mail message; and
   attachment document information module configured to generate and store attachment document management information for the one or more extracted attachment documents.

8. The electronic mail management server of claim 7 wherein the task history recording module is further configured to: (1) associate a task history identification number with the electronic mail message if the electronic mail message qualifies as a task mail, (2) associate the task history information and linkage information with the task history identification number, (3) and index the task history identification number.

9. The electronic mail management server of claim 7 wherein each extracted attachment document is stored; and
   wherein the attachment document management information for each extracted attachment document includes at least one of the following: filename, file size, transmission date of the electronic mail message associated with the extracted attachment document, sender name, and pointer information on where the extracted attachment document is stored.

10. The electronic mail management server of claim 7 wherein task history recording module is further configured to append the task history identification number to the electronic mail message and forward the electronic mail message with the appended task history identification number to its intended destination.

11. The electronic mail management server of claim 8 further comprising:
a search control module configured to receive and execute a search request.

12. The electronic mail management server of claim 11 further comprising:
a task history attachment document look-up module configured to retrieve a list of attachment documents associated with a first specified task history identification number when the search request is for the list of attachment documents associated with the first specified task history identification number; and a task history search module configured to: (1) retrieve information associated with a second specified task history identification number when the search request is for the second specified task history identification number; retrieve a first list of electronic mail messages associated with a third specified task history identification number when the search request is for the first list of electronic mail messages associated with the third specified task history identification number; (2) retrieve a second list of electronic mail messages if the search request is for the second list of electronic mail messages; (3) retrieve a particular electronic mail message if the search request is for the particular electronic mail message; and (4) retrieve a particular attachment document if the search request is for the particular attachment document.

* * * * *